(12) United States Patent
Xie et al.

(10) Patent No.: US 11,339,227 B2
(45) Date of Patent: May 24, 2022

(54) CYCLODEXTRIN POLYMER FOR FAST ABSORPTION OF ORGANIC POLLUTANTS DISSOLVED IN WATER

(71) Applicant: Nanjing University, Nanjing (CN)

(72) Inventors: Xianchuan Xie, Nanjing (CN); Xuejiao Hu, Nanjing (CN); Guizhou Xu, Nanjing (CN)

(*) Notice: Subject to any disclaimer, the term of this patent is extended or adjusted under 35 U.S.C. 154(b) by 0 days.

(21) Appl. No.: 16/683,289

(22) Filed: Nov. 14, 2019

(65) Prior Publication Data

US 2021/0179739 A1    Jun. 17, 2021

(51) Int. Cl.
*C08B 37/16* (2006.01)
*C08J 3/24* (2006.01)

(52) U.S. Cl.
CPC ............ *C08B 37/0012* (2013.01); *C08J 3/24* (2013.01)

(58) Field of Classification Search
CPC .................................. C08B 37/0012
USPC ......................................... 536/103
See application file for complete search history.

(56) References Cited

U.S. PATENT DOCUMENTS

2016/0304630 A1* 10/2016 Dichtel ............. B01J 20/28033

OTHER PUBLICATIONS

Jeong et al, Carbohydrate Polymers, 2018, 198, 563-574.*

* cited by examiner

*Primary Examiner* — Ganapathy Krishnan
(74) *Attorney, Agent, or Firm* — Bayramoglu Law Offices LLC

(57) ABSTRACT

Provided is a novel multifunctional cyclodextrin polymer capable of adsorbing the organic pollutants dissolved in water super-fast. A cyclodextrin polymer with a three-dimensional network structure and quaternary ammonium salt functional groups is obtained by mixing and crosslinking a cyclodextrin, a rigid crosslinking agent, a non-rigid crosslinking agent and a quaternary ammonium salt at certain temperature. The polymer is capable of adsorbing the organic pollutants dissolved in water at an ultra-fast rate, and the polymer after adsorption is easily regenerated and can be repeatedly used multiple times without causing a decrease in the adsorption property.

4 Claims, 18 Drawing Sheets

| Zeta potential (V) | mass fraction of quaternary ammonium salt (%) | pore size[a] (nm) | $S_L$[a] ($m^2g^{-1}$) | pore size[b] (nm) | $S_{BET}$[b] ($m^2g^{-1}$) |
|---|---|---|---|---|---|
| +30.0 | 4.5 | 3.58 | 89 | 7.48 | 8.8 | a  Pore volume and Langmuir specific surface area measured by $CO_2$ adsorption isotherm
b  Pore volume and BET specific surface area measured by $N_2$ adsorption isotherm

FIG.2

| Pollutants | Adsorbent | pseudo second order kinetic parameters | | | Elovich kinetic parameters | | |
|---|---|---|---|---|---|---|---|
| | | $q_e$ (mg g$^{-1}$) | $K_2$ (g mg$^{-1}$ min$^{-1}$) | $R^2$ | $\alpha$ (mg g$^{-1}$ min$^{-1}$) | $\beta$ (g mg$^{-1}$) | $R^2$ |
| BPA | cyclodextrin polymer | 21.5192 | 1.6188 | 0.996 | 6.37E+15 | 1.84E+00 | 0.999 |
| | activated carbon (20-40 mesh) | 22.5084 | 0.0435 | 0.990 | 94.4490 | 0.3012 | 0.975 |
| | XAD-4 type resin | 16.8479 | 1.2200E-03 | 0.986 | 0.3887 | 0.1746 | 0.988 |
| BPS | cyclodextrin polymer | 22.1331 | 1.2898 | 0.997 | 1.26E+14 | 1.6064 | 0.997 |
| | activated carbon (20-40 mesh) | 34.3265 | 1.3800E-03 | 0.995 | 1.9437 | 0.0967 | 0.990 |
| | XAD-4 type resin | 20.2545 | 5.1327E-04 | 0.998 | 0.2182 | 0.1237 | 0.998 |
| 2, 4, 6-trichlorophenol | cyclodextrin polymer | 17.0976 | 2.1831 | 0.997 | 2.14E+17 | 2.5385 | 0.998 |
| | activated carbon (20-40 mesh) | 24.7082 | 2.6500E-03 | 0.997 | 2.0559 | 0.1443 | 0.990 |
| | XAD-4 type resin | 31.3047 | 2.3094E-04 | 1.000 | 0.2303 | 0.0752 | 1.000 |
| 2-naphthol | cyclodextrin polymer | 11.0990 | 2.5563 | 0.992 | 3.04E+12 | 2.9121 | 0.998 |
| | activated carbon (20-40 mesh) | 18.3383 | 4.9200E-03 | 0.985 | 2.3032 | 0.2118 | 0.971 |
| | XAD-4 type resin | 15.4033 | 6.7523E-04 | 1.000 | 0.1655 | 0.1615 | 1.000 |
| 3-phenylphenol | cyclodextrin polymer | 15.6612 | 2.6338 | 0.997 | 4.29E+18 | 2.9713 | 0.998 |
| | activated carbon (20-40 mesh) | 20.4800 | 3.6600E-03 | 0.999 | 2.0506 | 0.1816 | 0.994 |
| | XAD-4 type resin | 23.2543 | 3.8476E-04 | 1.000 | 0.2130 | 0.1039 | 1.000 |
| humic acid | cyclodextrin polymer | 10.0264 | 5.8658 | 1.000 | 7.80E+34 | 8.4768 | 0.998 |
| | activated carbon (20-40 mesh) | 1.9562 | 0.1925 | 0.912 | 1.9944 | 2.8445 | 0.981 |

FIG.7

| pollutants | Langmuir | | | Freundlich | | |
|---|---|---|---|---|---|---|
| | $Q_m$ (mg g$^{-1}$) | $K_L$ (L mg$^{-1}$) | $R^2$ | $K_F$ (mg$^{(1-1/n)}$ g$^{-1}$ L$^{1/n}$) | n | $R^2$ |
| BPA | 103.2 | 0.146 | 0.943 | 25.4 | 0.29 | 0.989 |
| BPS | 117.0 | 0.057 | 0.967 | 20.8 | 0.33 | 0.990 |
| 2,4,6-Triphenylphenol | 101.4 | 0.039 | 0.951 | 12.8 | 0.40 | 0.998 |
| 2-naphthol | 67.5 | 0.043 | 0.978 | 7.2 | 0.46 | 0.999 |
| 3-phenylphenol | 100.7 | 0.069 | 0.964 | 17.1 | 0.37 | 0.995 |
| Humic acid | 40.004 | 9.368 | 0.833 | 25.957 | 0.134 | 0.940 |

FIG.9

CYCLODEXTRIN POLYMER FOR FAST ABSORPTION OF ORGANIC POLLUTANTS DISSOLVED IN WATER

CROSS-REFERENCE TO RELATED APPLICATIONS

This application claims priority to Chinese Patent Application No. 201810589683.7 with a filing date of Jun. 8, 2018. The content of the aforementioned applications, including any intervening amendments thereto, are incorporated herein by reference.

TECHNICAL FIELD

The present disclosure relates to a novel multifunctional cyclodextrin polymer capable of adsorbing the organic pollutants dissolved in water super-fast.

BACKGROUND

In recent years, methods for removing the organic pollutants dissolved in water reported in literatures mainly include adsorption method, photocatalytic method, biological method, membrane filtration method, and the like. The photocatalytic method, the biological method, the membrane filtration method and other methods have high technological investment and high operating costs, which are difficult to promote in practical engineering. The adsorption method is the most commonly used water treatment technology due to low energy consumption and simple process. At present, the commonly used adsorbents are activated carbon and resin, but the cost of activated carbon production and regeneration is relatively high, and the adsorption performance after regeneration is difficult to recover, and the adsorption rate on low concentration of organic micropollutants is not good. The adsorption rate of resin is slow and its synthesis is usually carried out in organic reagents, which does not conform to the concept of green chemistry advocated nowadays. Therefore, it is necessary to develop a multifunctional material that can quickly absorb the dissolved organic matter in water and has a green synthetic route.

Cyclodextrin is a product derived from the hydrolysis of starch. It is a biological reagent that is harmless to organisms. Due to its special external hydrophilic and internal hydrophobic annular cavity structure, it can form host-guest inclusion compound with a variety of target molecules. Cyclodextrins have good affinity and are usually prepared into various cyclodextrin polymers as needed. It is reported that most of the cyclodextrin polymers are obtained by reacting cyclodextrin with a flexible crosslinking agent or a rigid crosslinking agent, but the resulting cyclodextrin polymer either has a low adsorption rate, usually takes several hours or more to reach the adsorption equilibrium, or requires a large amount of organic solvent to be used in the preparation process. At present, composite multifunctional cyclodextrin polymers which can be synthesized in water and can quickly remove the dissolved organic pollutants in water have not been reported. Therefore, how to prepare a multifunctional cyclodextrin polymer material in a simple manner in the aqueous phase while maintaining its fast adsorption performance has become a new subject.

SUMMARY

The Technical Problem to be Solved

Based on the above problem, the technical problem to be solved by the present disclosure is as follows.

Based on the previous studies, the present disclosure proposes to use a non-rigid crosslinking agent and a rigid crosslinking agent simultaneously in the preparation process of a cyclodextrin polymer, and add a quaternary ammonium salt immediately after the formation of oligomer. The introduction of the non-rigid crosslinking agent can crosslink the cyclodextrin monomer and impart a certain swelling property to the polymer material. The rigid crosslinking agent can be used as a structure regulation agent to make the polymer material have certain microporosity and be capable of maintaining the stability of the polymer pores after swelling as a skeleton. The introduction of the quaternary ammonium salt enables the material adsorb natural organic matter such as humic acid in water. The cyclodextrin polymer material thus prepared exhibits very fast adsorption performance with respect to various organic substances dissolved in water. The preparation of the polymer only needs to be carried out in the green solvent of water, and the synthesis process is very simple and easy for industrial production.

The technical solution of the present disclosure is as follows:

A novel cyclodextrin polymer with ultra-fast adsorption performance, which is obtained through the following process, is provided. A cyclodextrin is crosslinked with a non-rigid crosslinking agent and a rigid crosslinking agent in an alkaline aqueous solution at a certain temperature. After the oligomer is formed, a quaternary ammonium salt solution is added. After the reaction is continued for a while, the reaction mixture is filtered, washed successively with water, dilute hydrochloric acid, ethanol, dichloromethane, and dried to obtain a multifunctional cyclodextrin polymer having ultra-fast adsorption performance.

Therefore, the present disclosure provides:

1. A method for preparing a novel cyclodextrin polymer, wherein the cyclodextrin polymer is obtained by adding a quaternary ammonium salt during a process in which a cyclodextrin is mixed with a rigid crosslinking agent and a non-rigid crosslinking agent to carry out a crosslinking reaction.

2. Preferably, the cyclodextrin is α-cyclodextrin, β-cyclodextrin, or γ-cyclodextrin, and a combination thereof.

3. Preferably, the rigid crosslinking agent is a crosslinking agent having a benzene ring structure.

4. Preferably, the crosslinking agent having a benzene ring structure is tetrafluoroterephthalonitrile, decafluorobiphenyl, decafluorobenzophenone, octafluoronaphthalene, and a combination thereof.

5. Preferably, the addition amount of the rigid crosslinking agent is 0.375 to 1.5 times the amount of the cyclodextrin substance.

6. Preferably, the non-rigid crosslinking agent is epichlorohydrin.

7. Preferably, the addition amount of the non-rigid crosslinking agent is 20 to 50 times the amount of the cyclodextrin substance.

8. Preferably, the quaternary ammonium salt is (2, 3-epoxypropyl) trimethylammonium chloride, 3-chloro-2-hydroxypropyltrimethylammonium chloride, (2-chloromethyl) trimethylammonium chloride, (3-methoxycarbonylpropyl) trimethylammonium chloride, and a mixture thereof.

9. Preferably, the addition amount of the quaternary ammonium salt is 0.25 to 2 times the mass of the cyclodextrin.

10. Preferably, the reaction is carried out in an alkaline aqueous solution which is an aqueous solution of sodium hydroxide or potassium hydroxide.

11. Preferably, the concentration of the alkaline aqueous solution is 2 to 8 mol $L^{-1}$.

12. A novel multifunctional cyclodextrin polymer obtained by mixing a cyclodextrin with a rigid crosslinking agent and a non-rigid crosslinking agent to carry out a crosslinking reaction and adding a quaternary ammonium salt during the crosslinking reaction, wherein the cyclodextrin polymer has a quaternary ammonium salt functional group and has a three-dimensional network structure.

13. The cyclodextrin polymer according to (12) capable of removing organic matter dissolved in water.

In the present disclosure, the quaternary ammonium salt is added during the mixing and crosslinking process of the cyclodextrin with the non-rigid crosslinking agent and the rigid crosslinking agent, so that the prepared cyclodextrin polymer has certain swellability, rigidity and electropositivity at the same time. This kind of novel cyclodextrin polymer is capable of removing the organic pollutants dissolved in water very fast.

BRIEF DESCRIPTION OF THE DRAWINGS

FIG. 2 is a chart showing the analysis of Zeta potential, quaternary ammonium salt content and specific surface area of an example.

FIG. 7 shows a fitting parameter table of pseudo second order kinetic equation and Elovich equation used in the adsorption kinetics of BPA, BPS, 2, 4, 6-trichlorophenol, 3-phenylphenol and 2-naphthol onto an Example, 20-40 mesh activated carbon and XAD type resin; and a fitting parameter table of pseudo second order kinetic equation and Elovich equation used in the adsorption kinetics of humic acid onto an Example, 20-40 mesh activated carbon and D201 type resin.

FIG. 9 shows a Freundlich model and a Langmuir model fitting parameter table for the adsorption thermodynamics of BPA, BPS, 2, 4, 6-trichlorophenol, 3-phenylphenol, 2-naphthol and humic acid onto an Example.

EMBODIMENTS

Synthesis of Cyclodextrin Polymer

Certain amounts of rigid crosslinking agent and flexible crosslinking agent were added into a round bottom flask, the round bottom flask was placed in an oil bath equipped with a magnetic stirrer, and the temperature and the rotation speed of the oil bath were adjusted. After reaching the set temperature, a cyclodextrin alkaline aqueous solution and a quaternary ammonium salt aqueous solution were added sequentially, stirring was continued and the reaction was carried out for 12 to 16 h. The reaction was terminated, the mixture was filtrated, and the precipitate was washed successively with distilled water, dilute hydrochloric acid, ethanol and dichloromethane for several times and dried in a vacuum oven for 12 h to obtain a novel multifunctional cyclodextrin polymer.

Figure 1:
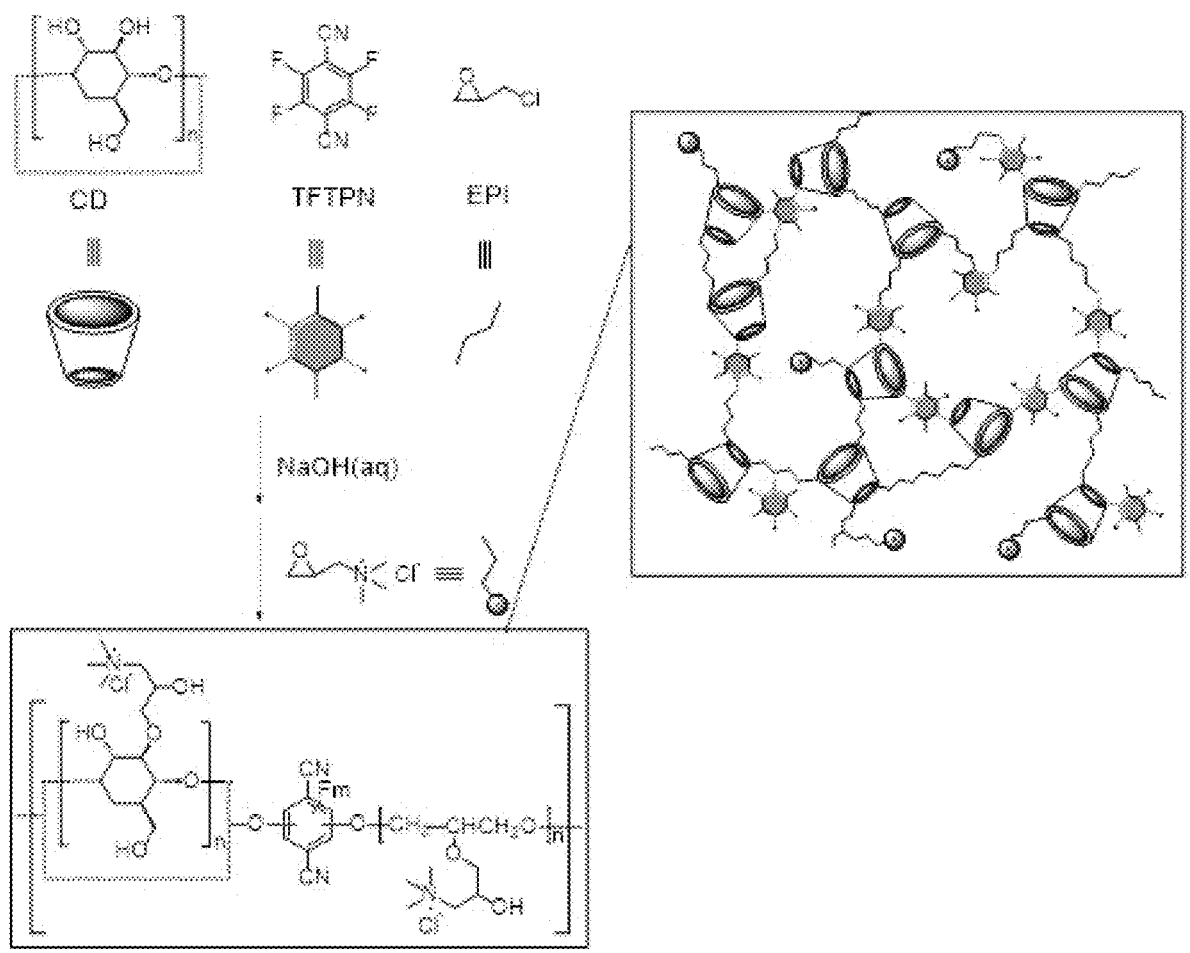
FIG. 1 is a synthetic route for preparing a novel multifunctional cyclodextrin polymer by mixing and crosslinking cyclodextrin with epichlorohydrin, (2, 3-epoxypropyl) trimethylammonium chloride and tetrafluoroterephthalonitrile.

FIG. 1 is a schematic view showing the synthesis route of the cyclodextrin polymer. The source of raw materials used for the polymer is abundant, the preparation method is simple and the obtained polymer has quaternary ammonium salt functional groups and a three-dimensional network structure.

The cyclodextrin to be used is α-, β- and γ-cyclodextrin and a mixture thereof, and may also be a polymer such as a dimer or a trimer of each of the above cyclodextrins.

The crosslinking agent to be used may be selected from tetrafluoroterephthalonitrile, tetrachloroterephthalonitrile, decafluorobiphenyl, octafluoronaphthalene, etc., or a mixture thereof. As a preferable rigid crosslinking agent, tetrafluoroterephthalonitrile is the most preferable rigid crosslinking agent from the viewpoint of cost and reactivity.

As the flexible crosslinking agent, epichlorohydrin may be selected from the viewpoint of cost and reactivity. However, those skilled in the art will recognize that any chain crosslinking agent capable of reacting with a hydroxyl group on the cyclodextrin or a group on the rigid crosslinking agent may be selected theoretically. There are no specific requirements for the length of the chain and the length of the chain depends on the actual needs, but it is preferably a substance capable of dissolving the rigid crosslinking agent.

The quaternary ammonium salt to be used may be selected from (2, 3-epoxypropyl) trimethylammonium chloride, 3-chloro-2-hydroxypropyltrimethylammonium chloride, (2-chloromethyl) trimethylammonium chloride, (3-methoxycarbonylpropyl) trimethylammonium chloride, and a mixture thereof. As a preferable quaternary ammonium salt, (2, 3-epoxypropyl) trimethylammonium chloride is an optimum quaternary ammonium salt in view of reactivity.

The cyclodextrin polymer of the present disclosure combines the advantages of the rigid material, the flexible material and the quaternary ammonium salt and has a certain porosity, swellability and electropositivity. The material can maintain a certain pore structure after swelling. Thus, the polymer exhibits an ultra-fast adsorption performance for a variety of dissolved organic matter.

The adsorbed objects are some dissolved organic pollutants that are harmful to the environment and health, mainly including natural organic pollutants, endocrine disruptors, plastic components and organic phenolic substances, etc. For example, the natural organic pollutants include, but not limited to, humic acid. For example, the endocrine disruptors include, but are not limited to, bisphenol A. For example, the plastic components include, but are not limited to, bisphenol S. For example, the organic phenolic substances include, but are not limited to, 2-naphthol, 3-phenylphenol, and 2, 4, 6-trichlorophenol.

The concentration of organic pollutants is not specifically defined as long as it can be dissolved. The amount of cyclodextrin polymer added is based on actual needs. In the Example, the addition amount of the cyclodextrin polymer was 1 mg/ml, and the concentration of the organic pollutants was 0.1 mmol/L, while the concentration of the humic acid natural organic matter was 10 mg/L.

The cyclodextrin polymer and various organic pollutant aqueous solutions are filtered through a filtration membrane after being contacted for a certain period of time. The content of organic pollutants in the filtrate was measured by high performance liquid chromatography and ultraviolet-visible spectrophotometer to determine the removal efficiencies of various organic pollutants.

The cyclodextrin polymer after absorbing the organic pollutants was separated by filtration and then washed with methanol, and the cyclodextrin polymer adsorbing the humic acid was separated by filtration and then washed with sodium hydroxide, thereby regenerating the cyclodextrin polymer. The regenerated cyclodextrin polymer can be reused in the method of the present disclosure.

EXAMPLES

In order to better understand the present disclosure, various cyclodextrin polymers were prepared under different conditions (such as cyclodextrin type, rigid crosslinking agent, flexible crosslinking agent and quaternary ammonium salt types, and addition amount, alkali solution type and concentration, etc.), and their adsorption effects on various organic pollutants in aqueous solution were characterized. The specific conditions of each Example are shown in Table 1.

TABLE 1

Summary table of Examples

| Number | cyclo-dextrin | rigid cross-linking agent | rigid cross-linking agent/cyclo-dextrin (mol/mol) | flexible cross-linking agent | flexible cross-linking agent/cyclo-dextrin (mol/mol) | quaternary ammonium salt | quaternary ammonium salt/cyclo-dextrin (g/g) | alkali | alkali concent-ration (mol/L) | adsorption rate BPA | humic acid |
|---|---|---|---|---|---|---|---|---|---|---|---|
| 1 | α | TFTPN | 0.75 | EPI | 35 | GTA | 2 | NaOH | 3 | very fast | very fast |
| 2 | β | TFTPN | 0.75 | EPI | 35 | GTA | 2 | NaOH | 3 | very fast | very fast |
| 3 | γ | TFTPN | 0.75 | EPI | 35 | GTA | 2 | NaOH | 3 | very fast | very fast |
| 4 | β + γ (1 + 1) | TFTPN | 0.75 | EPI | 35 | GTA | 2 | NaOH | 3 | very fast | very fast |
| 5 | β | DFBP | 0.75 | EPI | 35 | GTA | 2 | NaOH | 3 | relatively fast | relatively fast |
| 6 | β | DFBPN | 0.75 | EPI | 35 | GTA | 2 | NaOH | 3 | very fast | very fast |
| 7 | β | OFN | 0.75 | EPI | 35 | GTA | 2 | NaOH | 3 | relatively fast | relatively fast |
| 8 | β | TFTPN + DFBPN (1 + 1) | 0.75 | EPI | 35 | GTA | 2 | NaOH | 3 | very fast | very fast |
| 9 | β | TFTPN | 0.20 | EPI | 35 | GTA | 2 | NaOH | 3 | very slow | very slow |
| 10 | β | TFTPN | 0.375 | EPI | 35 | GTA | 2 | NaOH | 3 | very fast | very fast |
| 11 | β | TFTPN | 1.5 | EPI | 35 | GTA | 2 | NaOH | 3 | very fast | very fast |
| 12 | β | TFTPN | 3 | EPI | 35 | GTA | 2 | NaOH | 3 | very slow | very slow |
| 13 | β | TFTPN | 0.75 | EPI | 5 | GTA | 2 | NaOH | 3 | very slow | very slow |

TABLE 1-continued

Summary table of Examples

| Number | cyclo-dextrin | rigid cross-linking agent | rigid cross-linking agent/cyclo-dextrin (mol/mol) | flexible cross-linking agent | flexible cross-linking agent/cyclo-dextrin (mol/mol) | quaternary ammonium salt | quaternary ammonium salt/cyclo-dextrin (g/g) | alkali | alkali concentration (mol/L) | adsorption rate BPA | adsorption rate humic acid |
|---|---|---|---|---|---|---|---|---|---|---|---|
| 14 | β | TFTPN | 0.75 | EPI | 20 | GTA | 2 | NaOH | 3 | very fast | very fast |
| 15 | β | TFTPN | 0.75 | EPI | 50 | GTA | 2 | NaOH | 3 | very fast | very fast |
| 16 | β | TFTPN | 0.75 | EPI | 65 | GTA | 2 | NaOH | 3 | very slow | very slow |
| 17 | β | TFTPN | 0.75 | EPI | 35 | CHPTAC | 2 | NaOH | 3 | very fast | very fast |
| 18 | β | TFTPN | 0.75 | EPI | 35 | Carpronium chloride | 2 | NaOH | 3 | very fast | very fast |
| 19 | β | TFTPN | 0.75 | EPI | 35 | Chlormequat chloride | 2 | NaOH | 3 | very fast | very fast |
| 20 | β | TFTPN | 0.75 | EPI | 35 | GAT + CHPTAC(1 + 1) | 2 | NaOH | 3 | very fast | very fast |
| 21 | β | TFTPN | 0.75 | EPI | 35 | GTA | 1 | NaOH | 3 | very fast | very fast |
| 22 | β | TFTPN | 0.75 | EPI | 35 | GTA | 0.5 | NaOH | 3 | relatively fast | very fast |
| 23 | β | TFTPN | 0.75 | EPI | 35 | GTA | 0.25 | NaOH | 3 | very slow | relatively fast |
| 24 | β | TFTPN | 0.75 | EPI | 35 | GTA | 0.15 | NaOH | 3 | very slow | very slow |
| 25 | β | TFTPN | 0.75 | EPI | 35 | GTA | 2 | NaOH | 2 | very fast | very fast |
| 26 | β | TFTPN | 0.75 | EPI | 35 | GTA | 2 | NaOH | 6 | very fast | very fast |
| 27 | β | TFTPN | 0.75 | EPI | 35 | GTA | 2 | NaOH | 8 | very fast | very fast |
| 28 | β | TFTPN | 0.75 | EPI | 35 | GTA | 2 | KOH | 3 | very fast | very fast |

*Note:
TFTPN: tetrafluoroterephthalonitrile;
DFBP: decafluorobiphenyl;
DFBPN: decafluorobenzophenone;
OFN: octafluoronaphthalene;
EPI: epichlorohydrin;
GTA: (2,3-epoxypropyl) trimethylammonium chloride
β + γ (1 + 1): the ratio of the amount of β cyclodextrin and γ cyclodextrin substances is 1:1;
TFTPN + DFBPN (1 + 1): the ratio of the amount of TFTPN substance to the amount of DFBPN substance is 1:1;
CHPTAC: 3-chloro-2-hydroxypropyltrimethylammonium chloride
Carpronium chloride: (3-methoxycarbonylpropyl) trimethylammonium chloride
Chlormequat chloride: (2-chloroethyl) trimethylammonium chloride
GAT + CHPTAC (1 + 1): the mass ratio of (2,3-epoxypropyl) trimethylammonium chloride and 3-chloro-2-hydroxypropyltrimethylammonium chloride was 1:1
Very fast: the phenols adsorption equilibrium was reached within 10 min; the humic acid adsorption equilibrium was reached within 2.5 min.
Relatively fast: the phenols adsorption equilibrium was reached within 20 min; the humic acid adsorption equilibrium was reached within 5 min.
Relatively slow: the phenols adsorption equilibrium was reached within 30 min; the humic acid adsorption equilibrium was reached within 10 min.
Very slow: the phenols adsorption equilibrium was not reached within 30 min; the humic acid adsorption equilibrium was not reached within 10 min.

Material Characterization Instruments and Conditions:

Infrared measurement: a Bruker Tensor 27 Fourier infrared spectrometer was used, the material and KBr were mixed and ground and measured after tableting.

Specific surface area analysis: a Micromeritics ASAP 2020-M+C specific surface analyzer was used; 100 mg of sample was first activated at 90° C. for 24 h and then backfilled with $N_2$. The $N_2$ adsorption-desorption isotherm was then determined under liquid nitrogen (77 K) condition. The specific surface area of the material was calculated using the BET method carried by the instrument itself. The $CO_2$ adsorption-desorption isotherm was measured at 273 K, and the specific surface area of the material was calculated using the Langmuir method.

Zeta potential measurement: Nano ZS potential analyzer was used, 50 mg of cyclodextrin polymer β-CDP-2 was ultrasonicated in 50 mL of ultrapure water for 1 h to evenly disperse the cyclodextrin polymer in water, and the Zeta potential value was measured to be 30.0 V.

Quaternary ammonium salt content measurement: 1.0 g of cyclodextrin polymer β-CDP-2 was dispersed in 100 mL of 0.5M $Na_2SO_4$ aqueous solution, shaken in a constant temperature shaking incubator (25° C., 200r) for 2 h, and filtrated. 40 mL of filtrate was taken; 5 drops of 100 g/L potassium chromate indicator were added dropwise, and titrated with 0.1 M $AgNO_3$ aqueous solution. The above experiment was repeated twice for the residue.

HPLC measurement conditions: Agilent high performance liquid chromatograph was used, Waters C-18 column, mobile phase was methanol/water (70/30), flow rate was 1 ml $min^{-1}$, column temperature was 30° C., and injection volume was 10 uL. An ultraviolet detector was used, BPA detection wavelength was 276 nm, BPS detection wavelength was 258 nm, 2, 4, 6-trichlorophenol detection wavelength was 230 nm, 3-phenylphenol detection wavelength was 250 nm and 2-naphthol detection wavelength was 264 nm.

Absorbance test: Agilent UV—visible spectrophotometer was used, and the absorption wavelength was 254 nm.

The synthetic route of the novel cyclodextrin polymer is shown in FIG. 1. The source of raw materials used for the polymer is abundant, and the solvent used is water. The preparation method is very simple.

FIG. 2 shows the results of the analysis of Zeta potential, quaternary ammonium salt content, pore size and specific surface area of the cyclodextrin polymer β-CDP-2 of the Example. The Zeta potential value of the polymer was +30.0V, indicating that the surface of the cyclodextrin was attached with a positively charged quaternary ammonium salt functional group. The measured mass fraction of the quaternary ammonium salt was 4.5%. The results of the polymer measured by $CO_2$ adsorption method and $N_2$ adsorption method indicated that there are very small micropores and ultramicropores in the polymer.

Figure 3:
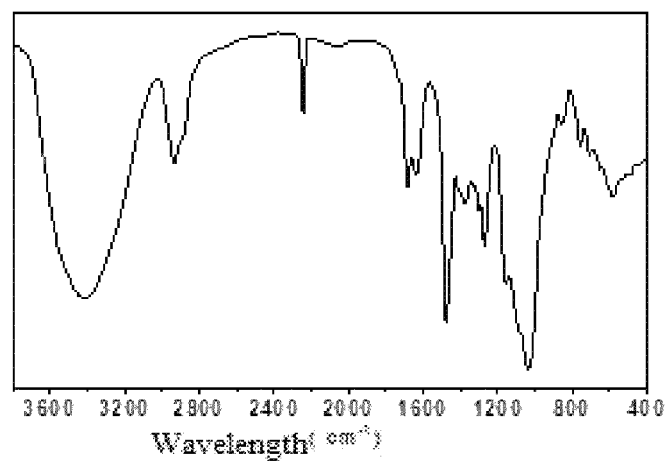
FIG. 3 shows an infrared spectrum diagram of an Example.

FIG. 3 is the infrared spectrum of the cyclodextrin polymer 13-CDP-2. The asymmetric stretching vibration at 2930 $cm^{-1}$ is broadened, indicating the reaction between the epichlorohydrin and the cyclodextrin. The absorption at 2240 $cm^{-1}$ corresponds to the stretching vibration of the cyano group. The absorption at 1035 $cm^{-1}$ and 1473 $cm^{-1}$ corresponds to the stretching vibration of aromatic carbon. The absorption at 1267 $cm^{-1}$ corresponds to the C-F stretching vibration and the absorption there becomes weak, indicating a partial substitution of F. This indicates that tetrafluoroterephthalonitrile and cyclodextrin have reacted.

Therefore, it can be known that the novel cyclodextrin polymer CDP-2 prepared in the Example was obtained by mixing and crosslinking epichlorohydrin and tetrafluoroterephthalonitrile with β-cyclodextrin, and the surface was attached with a quaternary ammonium salt functional group.

Figure 4:
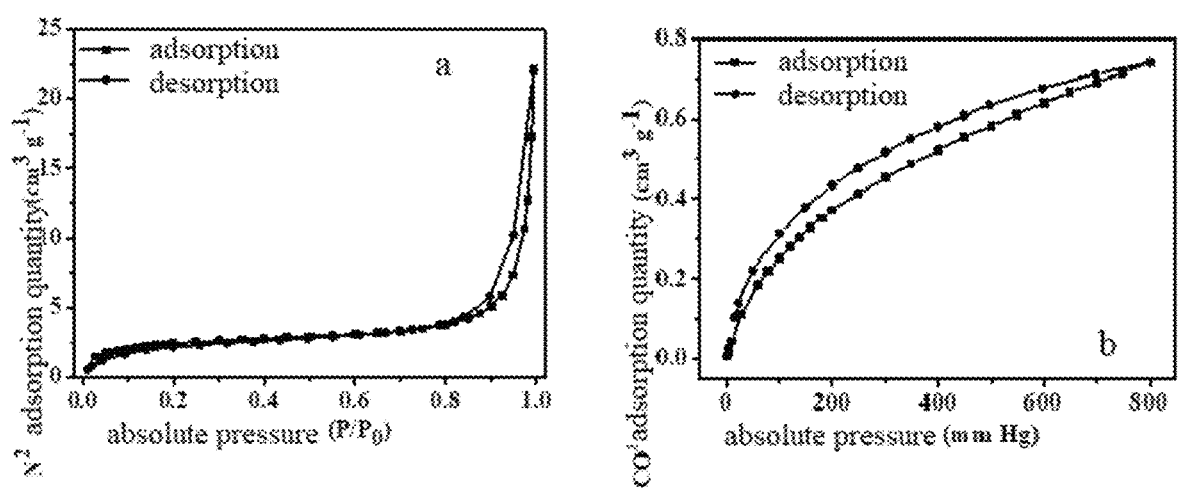
FIG. 4 shows $N_2$ (a) and $CO_2$ (b) adsorption-desorption isotherms of an Example.
Figure 5:
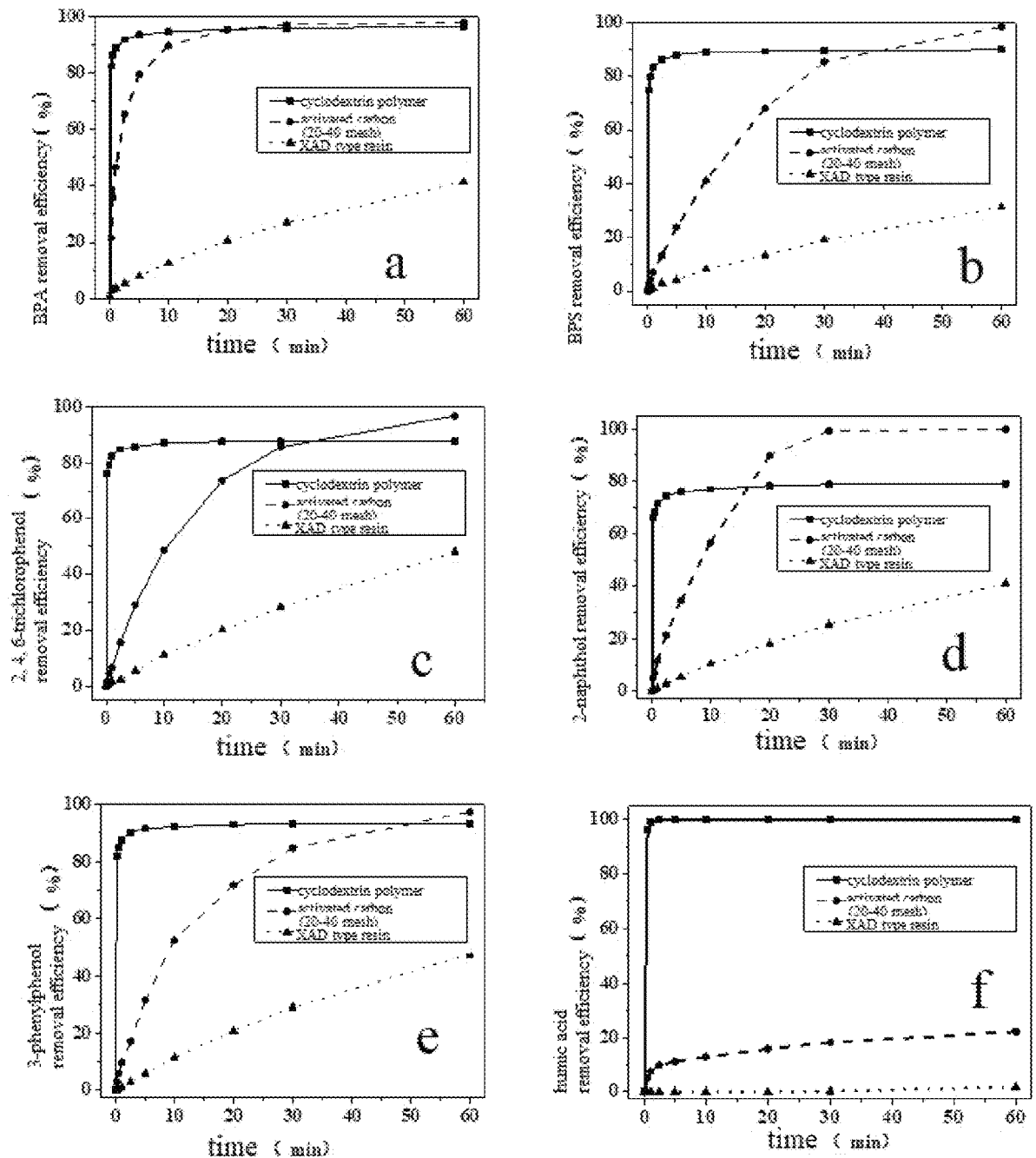
FIG. 5 is a graph showing the change in removal efficiencies over time of BPA (a), BPS (b), 2, 4, 6-trichlorophenol (c), 3-phenylphenol (d) and 2-naphthol (e) with an Example, 20-40 mesh activated carbon and XAD type resin; and a graph showing the change in removal efficiencies over time of humic acid (f) with an Example, 20-40 mesh activated carbon and D201 type resin.
Figure 6:
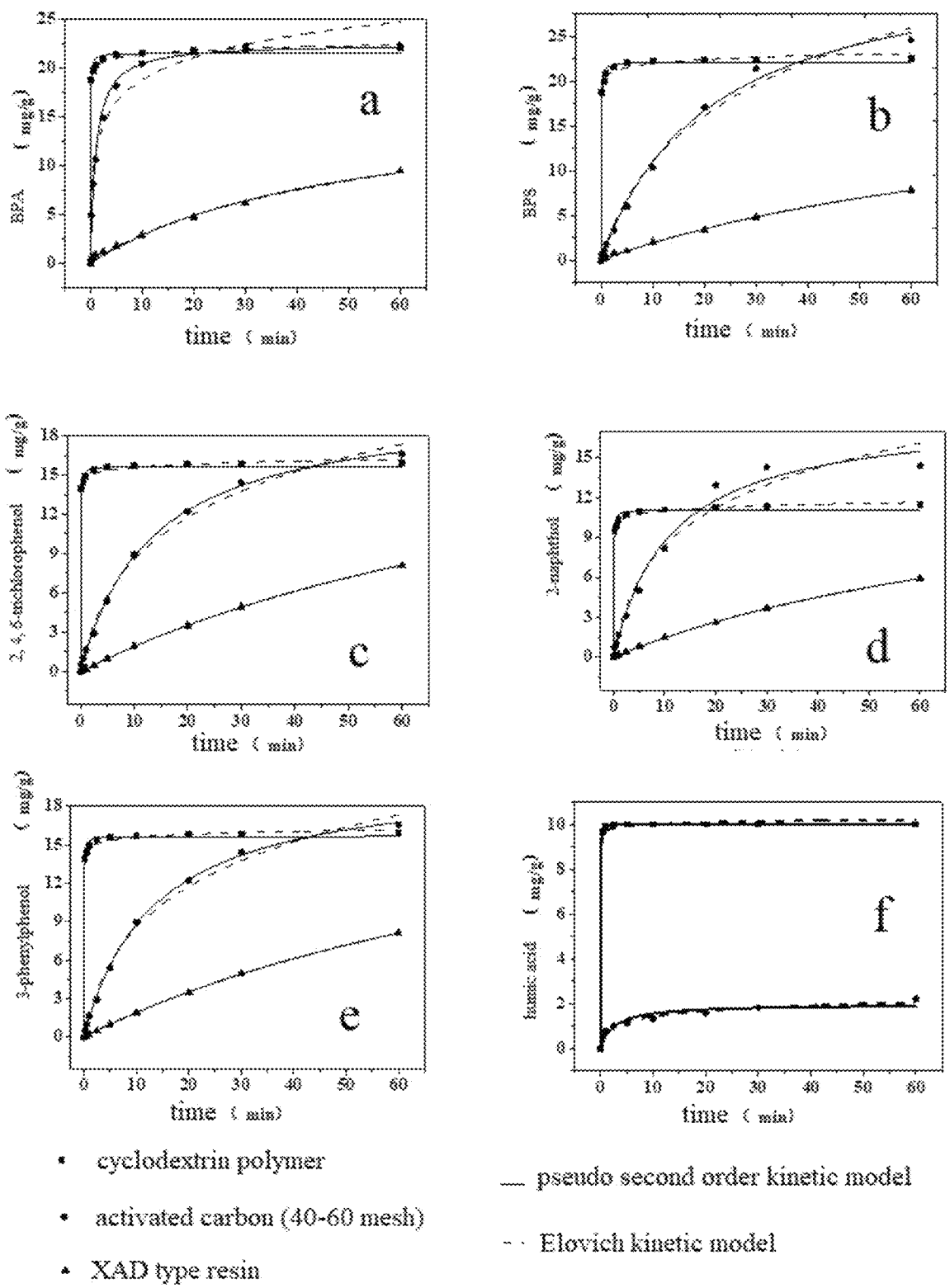
FIG. 6 shows fitting curves of adsorption kinetics of BPA (a), BPS (b), 2, 4, 6-trichlorophenol (c), 3-phenylphenol (d) and 2-naphthol (e) onto an Example, 20-40 mesh activated carbon and XAD type resin; and fitting curves of adsorption kinetics of humic acid (f) onto an Example, 20-40 mesh activated carbon and D201 type resin.
Figure 8:
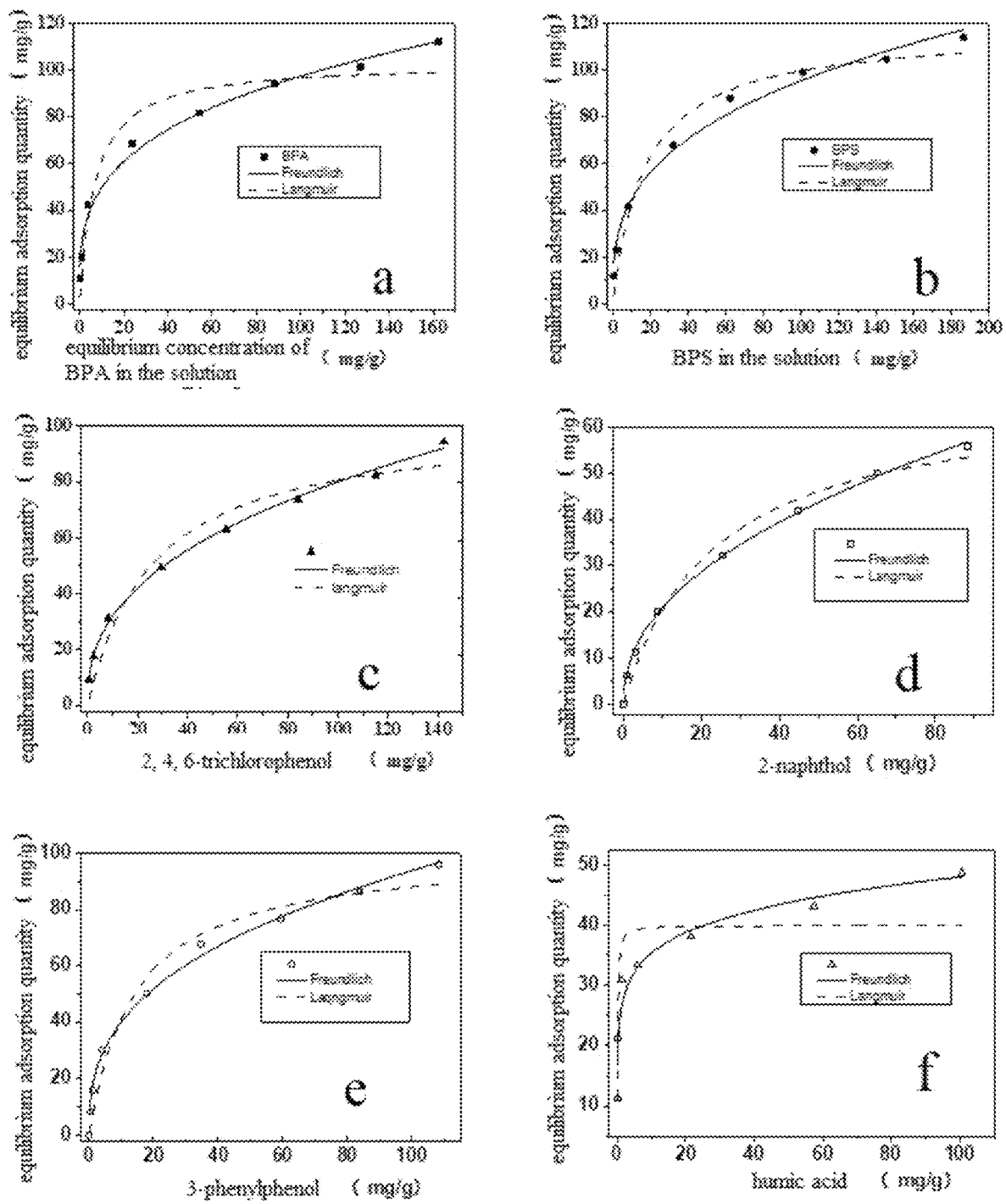
FIG. 8 shows adsorption isotherms of BPA (a), BPS (b), 2, 4, 6-trichlorophenol (c), 3-phenylphenol (d), 2-naphthol (e) and humic acid (f) on an Example.

It can be seen from FIG. 4 that the BET specific surface area (8.8 $m^2/g$) of the cyclodextrin polymer β-CDP-2 of the Example measured by the $N_2$ adsorption method was very low, but the Langmuir specific surface area of the polymer β-CDP-2 further measured by the $CO_2$ adsorption method can also reach 89 $m^2/g$. Since the $CO_2$ adsorption method is carried out at 0° C., the molecular diffusion is faster than that of the $N_2$ adsorption method carried out at liquid nitrogen temperature (−196° C.), the adsorption equilibrium is easily reached and smaller micropores and ultramicropores in the material can be detected, which indicates that the cyclodextrin polymer of the Example contains many ultramicropores.

Adsorption Kinetics of Water-Dissolved Organic Matter onto Cyclodextrin Polymer

Bisphenol A (BPA), bisphenol S (BPS), 2, 4, 6-trichlorophenol, 3-phenylphenol, 2-naphthol and humic acid were used as model pollutants, the adsorption kinetics of the water-dissolved organic matter onto the prepared cyclodextrin polymer material β-CDP-2 was investigated and compared with a commercial adsorbent of activated carbon DARCO-AC, adsorption resin XAD-4 or anionic resin D201 to characterize the superior performance of the material. The specific steps are as follows: 0.05 g of adsorbent was added into a 100 ml beaker and an agitating magnet was placed in, the rotation speed of the magnetic stirrer was adjusted to 150 rpm, and 50 ml of BPA, BPS, 2, 4, 6-trichlorophenol, 3-phenylphenol, 2-naphthol with a concentration of 0.1 mmol $L^{-1}$, and 10 ppm humic acid solution were added respectively. A small amount of water sample was taken up with a injector at certain time interval, filtered through a filtration membrane into a liquid phase vial. The concentrations of BPA, BPS, 2, 4, 6-trichlorophenol, 3-phenylphenol and 2-naphthol in the water sample were measured by high performance liquid chromatography (HPLC), and the concentration of the humic acid in the water sample was measured by using an ultraviolet-visible spectrophotometer. The removal efficiency of each organic matter dissolved in the solution was calculated with the following formula:

$$\text{Pollutant removal efficiency} = \frac{c_0 - c_t}{c_0} \times 100$$

In the formula: $c_0$ (mmol $l^{-1}$) and $c_t$ (mmol $l^{-1}$) are original concentration and residual concentration of the organic matter dissolved in the solution, respectively.

The quantity of dissolved organic matter adsorbed on the material was calculated using the following formula:

$$q_t = \frac{(c_0 - c_t)V}{m}$$

In the formula: $q_t$ (mmol $g^{-1}$) is the adsorption quantity at time t, v (L) is the volume of the adsorption solution, and m (g) is the mass of the adsorbent.

The adsorption kinetics data of the dissolved organic matter were respectively simulated using the pseudo second order kinetic equation and the Elovich equation. The equations are respectively as follows:

$$q_t = \frac{k_2 q_e^2 t}{1 + k_2 q_e t}$$

$$q_t = \frac{1}{\beta}\ln(\alpha\beta t + 1)$$

In the equation: $q_e$ (mmol $g^{-1}$) is the adsorption quantity at equilibrium, $k_2$ (g $mmol^{-1}$ $s^{-1}$) is the pseudo second order kinetic rate constant, α (mmol $g^{-1}$ $s^{-1}$) is the initial adsorption rate, and β (g $mmol^{-1}$) is the desorption constant associated with surface coverage.

The cyclodextrin polymer β-CDP-2 prepared in the Example was compared with activated carbon (20-40 mesh), XAD-4 type resin and D201 type resin for adsorption performance, and the results are shown in FIGS. 5a to 5f. Under the condition where the organic micro-pollutants BPA, BPS, 2, 4, 6-trichlorophenol, 2-naphthol and 3-phenylphenol had an initial concentration of 0.1 mmol $L^{-1}$, the cyclodextrin polymer β-CDP-2 was able to remove various pollutants in water quickly. The removal efficiency of 10 s reached 83% or more of the removal efficiency at equilibrium, and the adsorption equilibrium was reached within 10 minutes. The adsorption rates of the activated carbon (20-40 mesh) and the XAD-4 type resin were significantly slower than that of the Example and equilibrium was still not reached at time of 30 minutes. Under the condition where the natural organic matter of humic acid had an initial concentration of 10 ppm, the cyclodextrin polymer β-CDP-2 removed 99% of the humic acid in only 1 minute, while removal efficiencies of humic acid onto the activated carbon (20-40 mesh) and the D201 type resin at time of 60 minutes were 22% and 1.8%, respectively, which is far from the adsorption equilibrium.

The kinetic simulation of the adsorption data was conducted and the results are shown in FIGS. 6a to 6f. It can be seen that both of the pseudo second order kinetic equation and the Elovich equation can well fit the kinetic experiment data of the Example β-CDP-2, the activated carbon (20-40 mesh) and the XAD type resin adsorbing BPA, BPS, 2,4,6-trichlorophenol, 2-naphthol and 3-phenylphenol, and the kinetic experiment data of the Example β-CDP-2 adsorbing the humic acid, indicating that the adsorption of BPA, BPS, 2,4,6-trichlorophenol, 2-naphthol, 3-phenylphenol and humic acid on each material is a multiple mechanism of action.

FIG. 7 shows the relevant parameters of the two models of the pseudo second order kinetic equation and the Elovich equation for fitting the experimental data. It can be seen that the correlation coefficients of the two models are high (>0.97), indicating that both models can fit the experimental data well. The adsorption kinetic constant $k_2$ of the Example obtained by fitting with the pseudo second order kinetic equation is 100 to 200 times that of the activated carbon (20-40 mesh), and 500 to 600 times that of the XAD-4. The pseudo second order kinetic rate constant of humic acid adsorption on the Example β-CDP-2 was more pronounced than that that on the activated carbon (20-40 mesh), reaching 300 times. According to the results of the Elovich model, the initial adsorption rate (a) of each organic pollutant on the Example β-CDP-2 was much greater than that on the activated carbon (20-40 mesh) and the XAD-4, and the initial adsorption rate (α) of humic acid on the Example β-CDP-2 was also greater than that on the activated carbon (20-40 mesh). These results demonstrate that the affinities of the Example for the organic matter and humic acid are much greater than that of the comparative adsorbents. Such fast adsorption phenomenon indicates that the adsorption site on the Example β-CDP-2 is very easy to access, and although it has the smallest specific surface area compared with other adsorbents, it has more ultramicroporous structure and larger swelling property. The swelling of these ultramicropores into larger pores in aqueous solution may be the main reason for their fast adsorption performance.

Adsorption Isotherms of Water-Dissolved Organic Matter onto Cyclodextrin Polymer Bisphenol A (BPA), bisphenol S (BPS), 2, 4, 6-trichlorophenol, 3-phenylphenol, 2-naphthol and humic acid were used as model pollutants to investigate the adsorption capacity of the prepared cyclodextrin polymer material β-CDP-2 for organic matter dissolved in water. The specific steps are as follows: 50 mL of each of the single-component aqueous solutions of phenolic organic micro-pollutants having an initial concentration of 0.05 mM, 0.1 mM, 0.2 mM, 0.4 mM, 0.6 mM, 0.8 mM, 1.0 mM and 1.2 mM was taken and placed in a 100 mL conical flask, and 50 mL of each of the humic acid aqueous solutions having an initial concentration of 10 ppm, 20 ppm, 30 ppm, 40 ppm, 60 ppm, 100 ppm and 150 ppm was taken and placed in a 100 mL conical flask; 50 mg of the β-CDP-2 cyclodextrin polymer in the Example was added respectively, shaken in a constant temperature shaking incubator (20° C., 200 r) for 3 h, and then filtrated. The organic micro-pollutants in the filtrate were measured by high performance liquid chromatography (HPLC), and the humic acid in the filtrate was measured by an ultraviolet-visible spectrophotometer. The equilibrium adsorption quantity of the material to the dissolved organic matter was calculated using the following formula:

$$q_e = \frac{(C_0 - C_e)V}{m}$$

In the formula: $q_e$ (mg/g) and $C_e$ (mg/g) are the adsorption quantity at equilibrium and the equilibrium concentration of the solution, respectively; V (L) is the solution volume, and m (g) is the adsorbent mass.

The adsorption isotherms data of the dissolved organic matter were simulated with the Freundlich model and the Langmuir model respectively. The equations are as follows:

$$q_e = K_F C_e^{1/n}$$

$$q_e = Q_m K_L C_e / (1 + K_L C_e)$$

In the formula, $q_e$ (mg/g) and $C_e$ (mg/g) are the adsorption quantity at equilibrium and the equilibrium concentration of the solution, respectively; $K_F$, n are the Freundlich constants, where the $K_F$ is related to the adsorption quantity; $K_L$ (L/mg) is the Langmuir constant, which is related to the adsorption performance; Qm (mg/g) represents the maximum adsorption quantity.

It can be seen from FIGS. 8a to 8f that the adsorption of BPA, BPS, 2, 4, 6-trichlorophenol, 3-phenylphenol, 2-naphthol and humic acid on the Example β-CDP-2 more conforms to the Freundlich model. FIG. 9 shows the correlation parameters of the two model fitting experimental data. The correlation coefficient of the Freundlich model fitting is relatively high (>0.94), indicating that the adsorption of each organic pollutant on the cyclodextrin polymer prepared in the Example is adsorption on a heterogeneous surface and there may be different adsorption effects such as hydrophobic effect, cation bond effect or the like. This result confirms that the kinetic process reflects the inference that the Example β-CDP-2 has different adsorption mechanisms for various organic pollutants.

Recycling of Cyclodextrin Polymer

The reusability of the material was investigated by using BPA, BPS, 2, 4, 6-trichlorophenol, 3-phenylphenol, 2-naphthol mixture and humic acid as model pollutants. The change of the adsorption performance on dissolved organic matter of the material under different reuse times was investigated. Specific steps were as follows:

1, 50 mg of adsorbent was thoroughly contacted with 50 ml of 0.05 mmol $L^{-1}$ mixed aqueous solution of BPA, BPS, 2, 4, 6-trichlorophenol, 3-phenylphenol and 2-naphthol for 20 min at 20° C. under stirring. Then the suspension was filtrated. The filtrate was taken and the concentrations BPA, BPS, 2, 4, 6-trichlorophenol, 3-phenylphenol and 2-naphthol in the solution were measured by HPLC and the removal efficiency of each pollutant was calculated. The material after adsorption was washed with methanol at room temperature and then used in the next adsorption experiment. This adsorption/desorption experiment was carried out five times in total.

Figure 10:
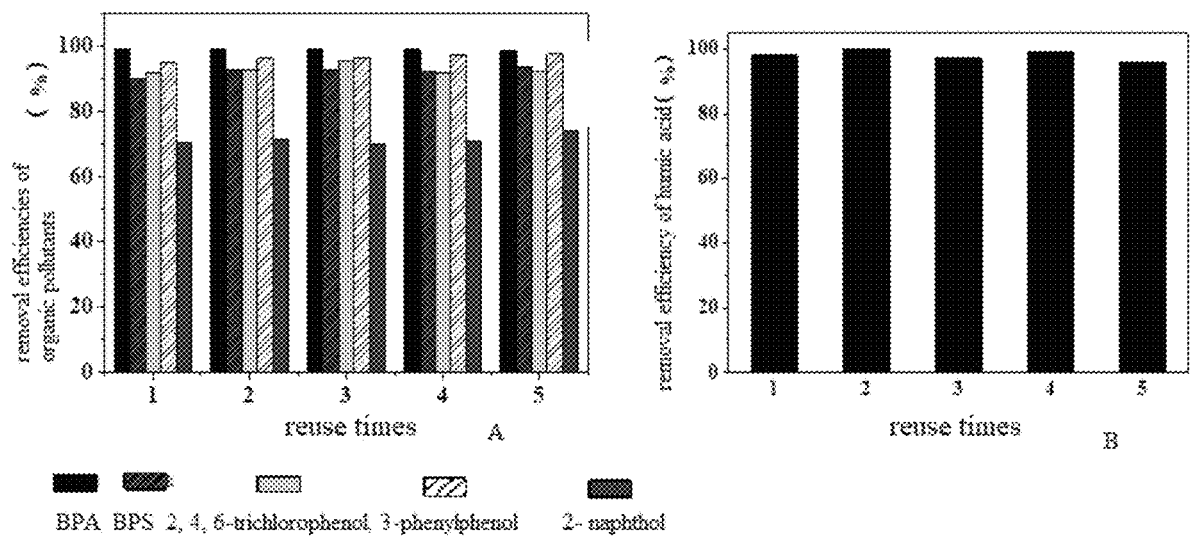
FIG. 10 is a graph showing the effect of the number of times of repeated use of the cyclodextrin polymer prepared in the Example on the adsorption performance of the material.

The reusability of the material is shown in FIG. 10 a. After the methanol washing, the adsorption performance of the Example β-CDP-2 on BPA, BPS, 2, 4, 6-trichlorophenol, 3-phenylphenol and 2-naphthol was almost unchanged. In all five repeated experiments, the removal efficiencies of BPA reached about 99%, the removal efficiencies of BPS reached 90% or more, the removal efficiencies of 2, 4, 6-trichlorophenol reached 92% or more, the removal efficiencies of 3-phenylphenol reached 95% or more, and the removal efficiencies of 2-naphthol reached 70% or more, indicating that the material is easily regenerated by washing at room temperature with methanol.

2, 50 mg of adsorbent was thoroughly contacted with 50 ml of 10 ppm humic acid solution for 10 min at 20° C. under stirring. Then the suspension was filtrated. The filtrate was taken and the concentration of humic acid was measured by using an ultraviolet-visible spectrophotometer and the removal efficiency of humic acid was calculated. The material after adsorption was washed successively with 2 M NaOH, 1% HCl, and water at room temperature, and then used in the next adsorption experiment. This adsorption/desorption experiment was carried out five times in total.

The reusability of the material is as shown in FIG. 10 b. After washing with NaOH/HCl, the adsorption performance of the β-CDP-2 cyclodextrin polymer in the Example with respect to humic acid was almost unchanged. The removal efficiency of humic acid in all five repeated experiments was 95% or more, indicating that the material is easily regenerated by washing with NaOH/HCl at room temperature.

Figure 11:
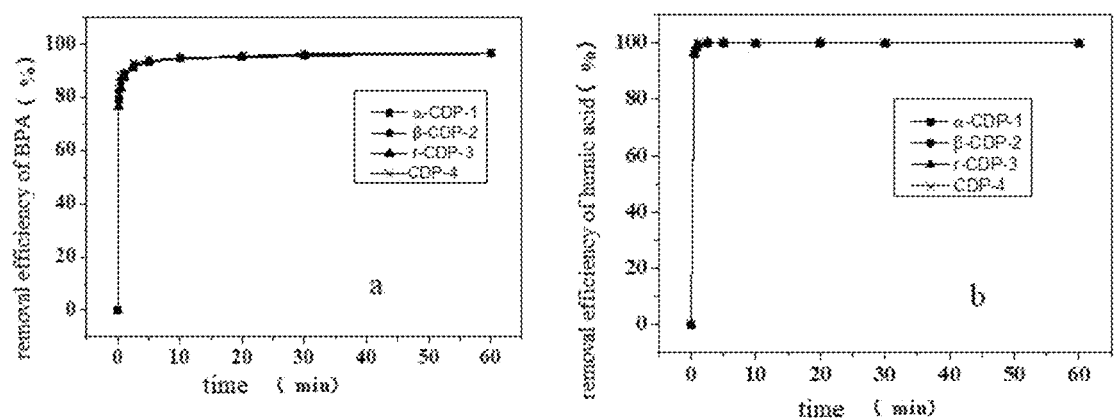
FIG. 11 is a graph showing the change in removal efficiencies over time of phenols (a) and humic acid (b) with polymers prepared by using different cyclodextrins.

FIG. 11 compares the adsorption rates of BPA (a) and humic acid (b) onto the polymers prepared with several different types of cyclodextrins and combination thereof. It can be seen that polymers having ultra-fast adsorption performance can be prepared using α, β and γ three types of cyclodextrins and mixtures thereof, and all the removal efficiencies of BPA were able to reach 95% or more at 10 min and the removal efficiencies of humic acid within 2.5 min were 100%. This is because the difference between different types of cyclodextrins is only the size of the cavity, and the reactive groups and adsorption sites are the same. Therefore, the obtained polymer has excellent adsorption performance.

Figure 12:
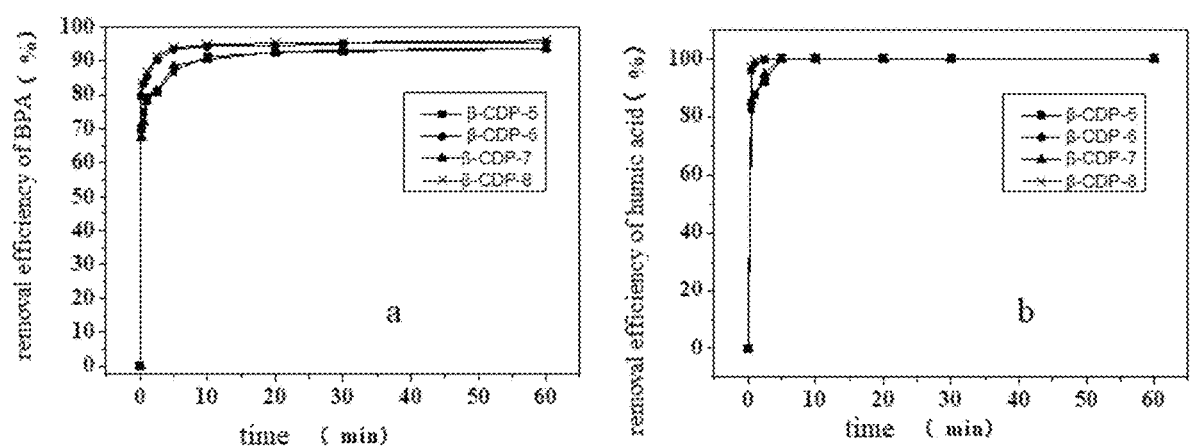
FIG. 12 is a graph showing the change in removal efficiencies over time of phenols (a) and humic acid (b) with β cyclodextrin polymers prepared by using different rigid crosslinking agents.

FIG. 12 shows the adsorption rates of BPA (a) and humic acid (b) onto the cyclodextrin polymers prepared by several different rigid crosslinking agents. It can be seen that decafluorobiphenyl, tetrafluoroterephthalonitrile, decafluorobenzophenone and octafluoronaphthalene, and the combination thereof can be used as a rigid crosslinking agent to prepare a cyclodextrin polymer having a very fast adsorption rate. Among them, tetrafluoroterephthalonitrile and decafluorobenzophenone are most preferred. This indicates that such rigid crosslinking agent containing a benzene ring structure mainly functions as a rigid scaffold, and as long as the rigid crosslinking agent is capable of reacting with the cyclodextrin it will theoretically facilitate the adsorption on the polymer.

Figure 13:
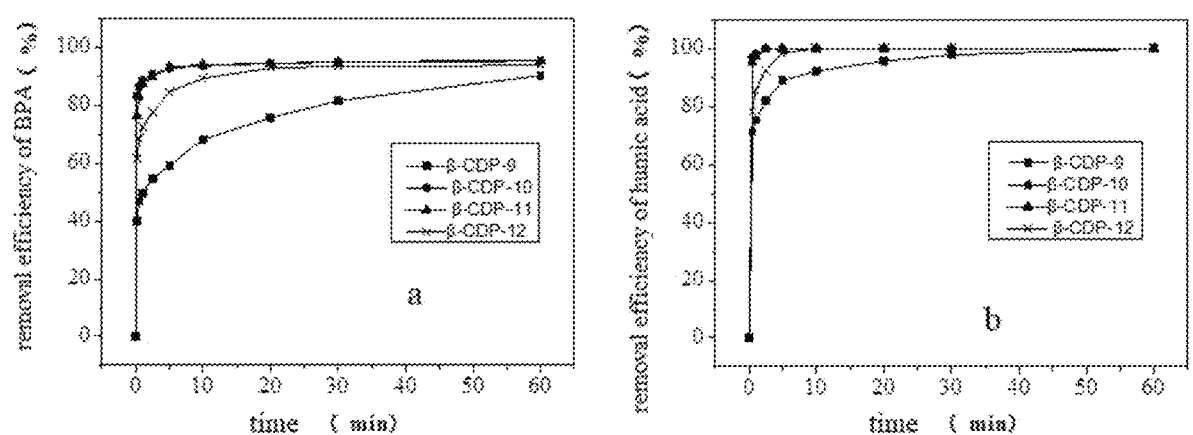
FIG. 13 is a graph showing the change in removal efficiencies over time of phenols (a) and humic acid (b) with β cyclodextrin polymers prepared by using different amounts of rigid crosslinking agent.

FIG. 13 shows the effect of different amounts of rigid crosslinking agent on the performance of the material adsorbing BPA (a) and humic acid (b). The molar ratio of the rigid crosslinking agent to the cyclodextrin used in the experiment was between 0.1875 and 3. The results showed that the adsorption rate of the polymer was the slowest when the addition amount of the rigid crosslinking agent was 0.1875 of the amount of the cyclodextrin, and the adsorption equilibrium was not reached within 30 min. This may be because the rigid structure in the polymer is too small to form enough holes and supports. In addition, it is also not suitable to add too much rigid crosslinking agent. When the addition amount was 3 times that of the cyclodextrin, the adsorption rate was also relatively slow, and it took 30 min to reach the adsorption equilibrium. This may be because the excessive introduction of rigid groups resulted in a decrease in the swelling property of the material. The suitable addition amount of the rigid crosslinking agent is 0.375 to 1.5 times that of the cyclodextrin. Among them, the effect is the best when the molar ratio of the addition amount of the rigid crosslinking agent to the cyclodextrin is 0.75.

Figure 14:
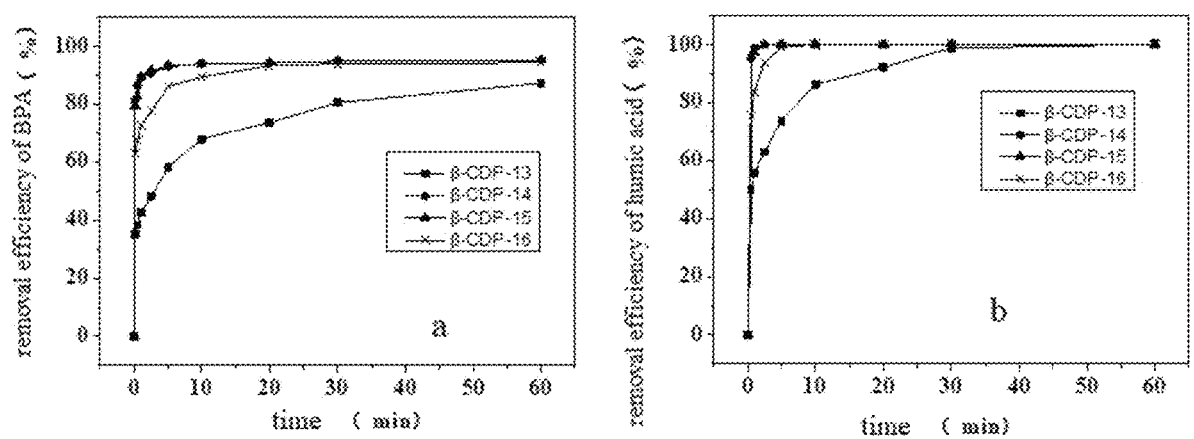
FIG. 14 is a graph showing the change in removal efficiencies over time of phenols (a) and humic acid (b) with β cyclodextrin polymers prepared by using different amounts of epichlorohydrins.

FIG. 14 shows the effect of the amounts of flexible crosslinking agent epichlorohydrin on the performance of the material adsorbing BPA (a) and humic acid (b). The molar ratio of the used epichlorohydrin to the cyclodextrin was between 5 and 65. It can be found that when the amount of EPI was too much or too little, the prepared cyclodextrin polymer had a relatively slow adsorption rate, and the adsorption did not reach equilibrium at 30 min, and the final adsorption amount also decreased. This is because the adsorption rate on the final cyclodextrin polymer depends on the ratio of the rigid structure to the flexible structure in the polymer, and the best adsorption performance can be only obtained when the rigidity and the swellability of the material are matched. A suitable amount of EPI is 20 to 50 times that of the cyclodextrin, and 35 times is the best.

Figure 15:
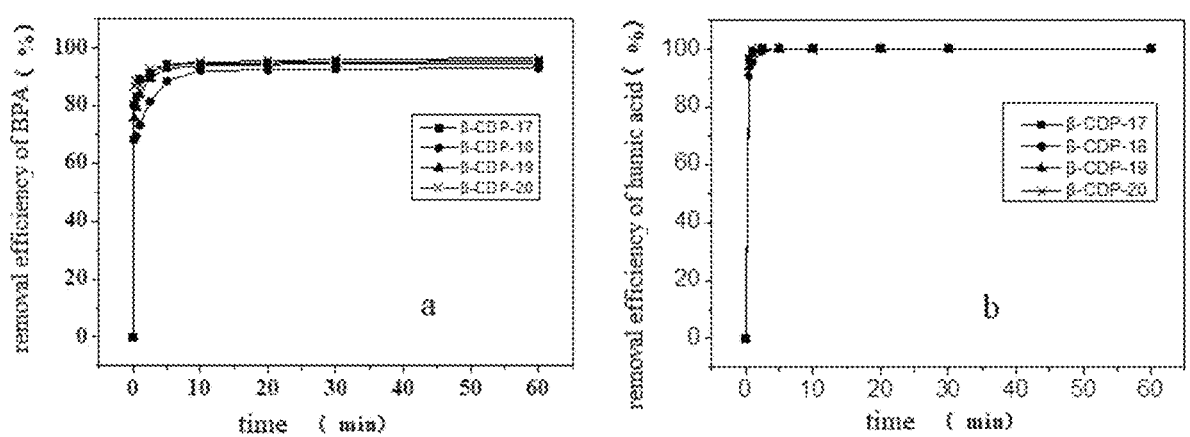
FIG. 15 is a graph showing the change in removal efficiencies over time of phenols (a) and humic acid (b) with β cyclodextrin polymers prepared by using different quaternary ammonium salts.

FIG. 15 shows the adsorption rates of BPA (a) and humic acid (b) onto the cyclodextrin polymers prepared by different quaternary ammonium salts. The results demonstrate that a polymer having an ultra-fast adsorption performance can be prepared by (2, 3-epoxypropyl) trimethylammonium chloride, 3-chloro-2-hydroxypropyltrimethylammonium chloride, (2-chlorethyl) trimethylammonium chloride, (3-methoxycarbonylpropyl) trimethylammonium chloride and the mixtures thereof. This is because the different quaternary ammonium salts did not change the spatial structure of the cyclodextrin polymer and the attached quaternary ammonium salt functional group was not changed.

Figure 16:
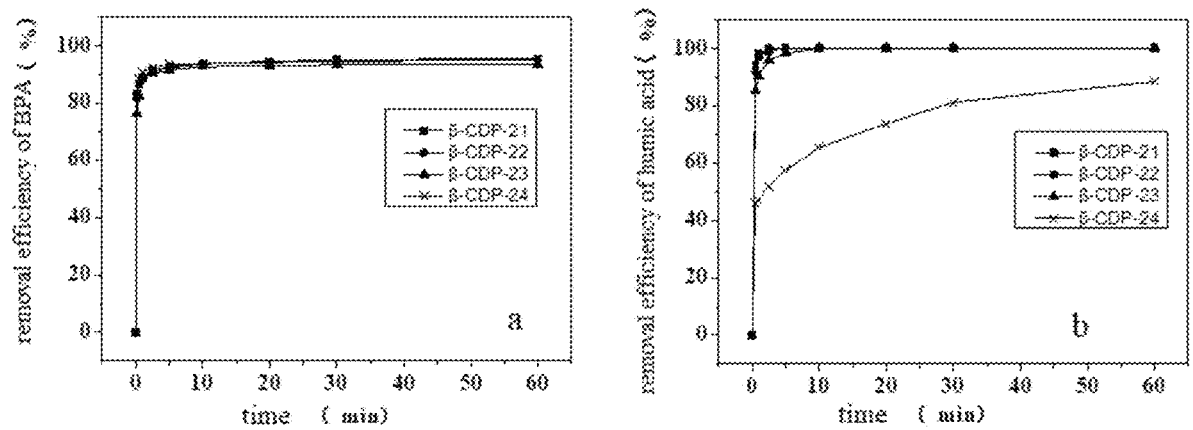
FIG. 16 is a graph showing the change in removal efficiencies over time of phenols (a) and humic acid (b) with β cyclodextrin polymers prepared by using different amounts of quaternary ammonium salts.

FIG. 16 shows the effect of different amounts of quaternary ammonium salt on the performance of the material adsorbing BPA (a) and humic acid (b). The mass ratio of the used epichlorohydrin to the cyclodextrin was between 1 and 0.15. It can be seen that when the content of the quaternary ammonium salt was less, the adsorption rate of humic acid onto the cyclodextrin polymer was slower. This is because there were fewer quaternary ammonium salt functional groups attached. But since the there is almost no change in the adsorption site for BPA, there is no effect on the adsorption rate of BPA.

Figure 17:
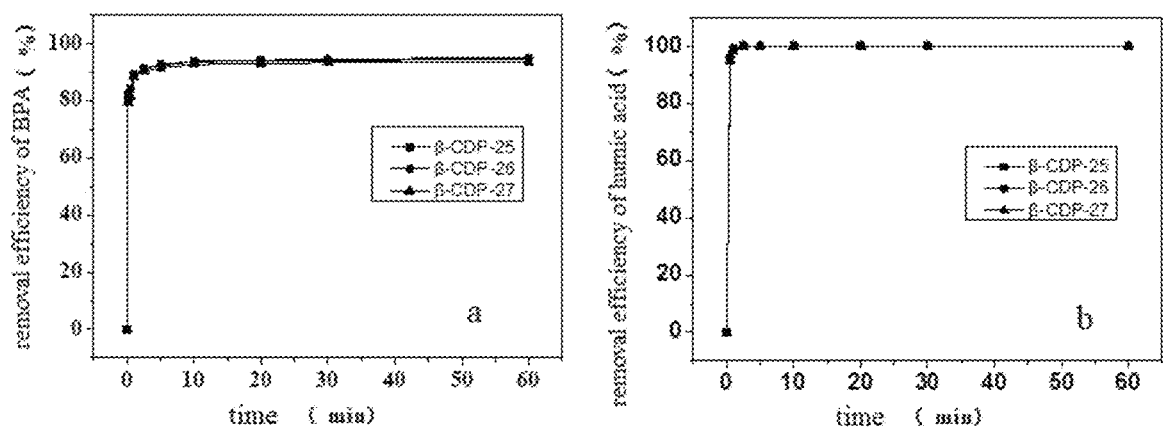
FIG. 17 is a graph showing the change in removal efficiencies over time of phenols (a) and humic acid (b) with β cyclodextrin polymers prepared under different alkali environments.

FIG. 17 compares the effect of several cyclodextrin polymers prepared under different alkali concentration conditions on the BPA adsorption performance. The concentrations of the alkali solutions used were 2 to 8 mol $L^{-1}$. It can be seen from the figure that the adsorption rate of BPA onto each of the cyclodextrin polymers prepared under the above several alkali concentrations was very fast, the BPA adsorption equilibrium was able to reach within 10 min and the final removal efficiency was able to reach 90% or more. The removal efficiency of humic acid reached 100% within 2.5 minutes.

Figure 18:
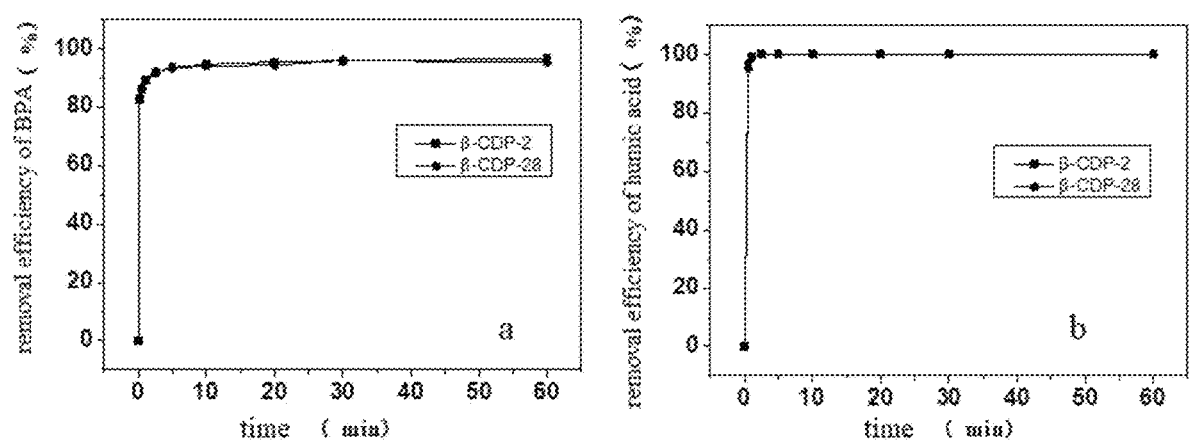
FIG. 18 is a graph showing the change in removal efficiencies over time of phenols (a) and humic acid (b) with β cyclodextrin polymers prepared at different alkali concentrations.

FIG. 18 shows the effect of the cyclodextrin polymers prepared by two different alkaline aqueous solutions on the BPA adsorption performance. It can be seen that the cyclodextrin polymer having fast adsorption rate can be prepared under the conditions of two strong alkaline aqueous solutions of KOH and NaOH, and both the removal efficiencies of BPA can reach 90% or more. The removal efficiency of humic acid was about 100%. Since the alkaline condition mainly functions to remove hydrogen from the hydroxyl group on the cyclodextrin to form an anion for further causing a nucleophilic substitution reaction, such a stronger alkali is required to facilitate the preparation of the polymer.

The above discussion is for illustrative purposes only and is not intended to limit the scope of the disclosure.

What is claimed is:
1. A cyclodextrin polymer,
wherein
the cyclodextrin polymer has a three-dimensional network structure and quaternary ammonium salt functional groups; and
the cyclodextrin is obtained by a method comprising the following steps:

mixing a rigid crosslinking agent and a non-rigid crosslinking agent to form a first mixture, adding a cyclodextrin in an alkaline aqueous solution to the first mixture at a specific temperature to obtain a second mixture, and adding the quaternary ammonium salt to the second mixture and stirring to carry out a crosslinking reaction, wherein the alkaline aqueous solution is an aqueous solution of sodium hydroxide or potassium hydroxide;

the rigid crosslinking agent is at least one agent selected from the group consisting of tetrafluoroterephthalonitrile, decafluorobiphenyl, decafluorobenzophenone, and octafluoronaphthalene;

the non-rigid crosslinking agent is epichlorohydrin;

the quaternary ammonium salt is at least one salt selected from the group consisting of (2, 3-epoxypropyl) trimethylammonium chloride, 3-chloro-2-hydroxypropylt-rimethylammonium chloride, (2-chloromethyl) trimethylammonium chloride, and (3-methoxycarbonylpropyl) trimethylammonium chloride, a molar ratio of the rigid crosslinking agent to the cyclodextrin is in the range of 0.375:1 to 1.5:1, a molar ratio of the non-rigid crosslinking agent to the cyclodextrin is in the range of 20:1 to 50:1, and a mass ratio of the quaternary ammonium salt to the cyclodextrin is in the range of 0.25:1 to 2:1.

2. The cyclodextrin polymer according to claim 1, wherein the cyclodextrin is at least one selected from the group consisting of α-cyclodextrin, β-cyclodextrin, and γ-cyclodextrin.

3. The cyclodextrin polymer according to claim 1, wherein the rigid crosslinking agent is tetrafluoroterephthalonitrile.

4. The cyclodextrin polymer according to claim 1, wherein the crosslinking agent is decafluorobenzophenone.

* * * * *